United States Patent
Marchione et al.

(10) Patent No.: US 10,746,301 B2
(45) Date of Patent: Aug. 18, 2020

(54) SEAL AND A METHOD OF MANUFACTURING THE SEAL

(71) Applicant: Caterpillar Inc., Peoria, IL (US)

(72) Inventors: Thierry Marchione, Heber City, UT (US); Timothy A. Thorson, Morton, IL (US); Dennis Michael Turczyn, Edelstein, IL (US)

(73) Assignee: Caterpillar Inc., Peoria, IL (US)

( * ) Notice: Subject to any disclaimer, the term of this patent is extended or adjusted under 35 U.S.C. 154(b) by 367 days.

(21) Appl. No.: 15/683,125

(22) Filed: Aug. 22, 2017

(65) Prior Publication Data

US 2019/0063609 A1    Feb. 28, 2019

(51) Int. Cl.
| | | |
|---|---|---|
| *F16J 15/16* | (2006.01) | |
| *C23C 30/00* | (2006.01) | |
| *C23C 28/02* | (2006.01) | |
| *C23C 24/10* | (2006.01) | |
| *B62D 55/088* | (2006.01) | |
| *B62D 55/15* | (2006.01) | |
| *B33Y 10/00* | (2015.01) | |
| *B33Y 80/00* | (2015.01) | |

(52) U.S. Cl.
CPC ........... *F16J 15/162* (2013.01); *C23C 24/106* (2013.01); *C23C 28/021* (2013.01); *C23C 30/00* (2013.01); *B33Y 10/00* (2014.12); *B33Y 80/00* (2014.12); *B62D 55/088* (2013.01); *B62D 55/0887* (2013.01); *B62D 55/15* (2013.01); *Y10T 29/49297* (2015.01)

(58) Field of Classification Search
CPC ... B33Y 10/00; B33Y 80/00; Y10T 29/49297; B62D 55/088; B62D 55/0887
See application file for complete search history.

(56) References Cited

U.S. PATENT DOCUMENTS

| | | | |
|---|---|---|---|
| 5,700,546 A | 12/1997 | Fujii et al. | |
| 5,980,813 A * | 11/1999 | Narang | B29C 64/40 264/401 |
| 10,119,615 B2 * | 11/2018 | Hoang | F16K 3/0227 |
| 2005/0189045 A1* | 9/2005 | Takayama | C21D 5/00 148/612 |
| 2011/0123383 A1* | 5/2011 | Fuwa | B33Y 40/00 419/11 |
| 2012/0119130 A1* | 5/2012 | Reed | F16K 7/126 251/335.2 |
| 2013/0065073 A1* | 3/2013 | Fuwa | C22C 33/0285 428/548 |
| 2016/0279734 A1* | 9/2016 | Schick | B23K 26/0006 |

(Continued)

FOREIGN PATENT DOCUMENTS

CN  205559794  9/2016

*Primary Examiner* — Jason L Vaughan
(74) *Attorney, Agent, or Firm* — Hibshman Claim Construction PLLC

(57) ABSTRACT

A method for manufacturing a seal is disclosed. The method includes depositing one or more layers of a first material on a metal base plate of a second material to form a main seal body of the seal. The second material is different from the first material. The method further includes separating the seal from the metal base plate such that the seal includes the main seal body and an outer seal layer retained on the main seal body to form a seal face surface of the seal. The outer seal layer is formed of a portion of the metal base plate.

6 Claims, 6 Drawing Sheets

(56) References Cited

U.S. PATENT DOCUMENTS

2016/0369896 A1   12/2016  Thorson et al.
2017/0343108 A1*  11/2017  Hoang .................. F16K 3/0227
2018/0154574 A1*   6/2018  Mark ....................... B22F 3/24
2018/0272429 A1*   9/2018  Delmotte ................ B23P 15/10
2018/0272607 A1*   9/2018  Chaffins ................ H05K 1/092

* cited by examiner

SEAL AND A METHOD OF MANUFACTURING THE SEAL

TECHNICAL FIELD

The present disclosure relates generally to seals. More particularly, the present disclosure relates to a method of manufacturing the seals.

BACKGROUND

Seals, such as mechanical face seals, may be employed in a variety of systems, environments, and/or applications. For example, mechanical face seals may be formed, at least in part, of a metal or other rigid material, and may be incorporated and utilized to sealingly engage another component, which may be a mechanical system component and/or another seal, and, in so doing, may retain lubricants within the system and/or may prevent external debris or foreign matter from being introduced within the internal, sealed environment of the interior of the system. However, under certain conditions which may be attendant to the operation and/or environment of the system, and/or the interaction between the components thereof, interaction between one or more components of the system may lead to wearing of the seal. The wearing of the seal may be caused due to numerous reasons such as, but not limited to, frictional forces which the seal may experience, such as, at the sealing interface. Repeated exposure to frictional forces and/or one or more instances of exposure to a frictional force which may be excessive may result in damage to the seal which may compromise the effectiveness of the seal to retain lubricants within the system and/or may prevent external debris or foreign matter from being introduced within the internal, sealed environment of the interior of the system, which may, in turn, compromise the operation of the system.

U.S. Pat. No. 5,700,546 relates to a seal that comprises a combination of a movable member and a stationary member. Either one of the movable and stationary members is irradiated with an ion beam consisting essentially of nitrogen ions and at the same time as titanium is vacuum-deposited on the surface of either the movable member or the stationary member, thereby forming a thin titanium nitride film.

SUMMARY

In an aspect of the present disclosure, a method for manufacturing a seal is provided. The method includes depositing one or more layers of a first metal material on a substrate of a second metal material to form an annular seal body of the seal. The second metal material is different from the first metal material. The method further includes separating the seal from the substrate such that the seal includes the annular seal body and a sealing layer retained on the annular seal body to form a sealing surface of the seal. The scaling layer is formed of a portion of the substrate.

In another aspect of the present disclosure, a seal is provided. The seal includes an annular seal body having an outer circumferential surface and an inner circumferential surface. The annular seal body is formed of a first metal material. The seal further includes one or more channels having one or more openings defined on the inner circumferential surface such that the one or more channels extend through the annular seal body. Furthermore, the seal includes a scaling layer retained on at least one surface of the annular seal body to form a sealing surface of the seal. The sealing layer is formed of a second metal material different from the first metal material.

In a yet another aspect of the present disclosure, a seal is provided which is manufactured by a process including depositing one or more layers of a first metal material on a substrate of a second metal material to form an annular seal body of the seal. The second metal material is different from the first metal material. The method further includes separating the seal from the substrate such that the seal includes the annular seal body and a sealing layer retained on the annular seal body to form a sealing surface of the seal. The sealing layer is formed of a portion of the substrate.

DETAILED DESCRIPTION

Reference will now be made in detail to embodiments of the present disclosure, examples of which are illustrated in the accompanying drawings. Wherever possible, the same reference numbers will be used throughout the drawings to refer to the same or like parts.

Figure 1:
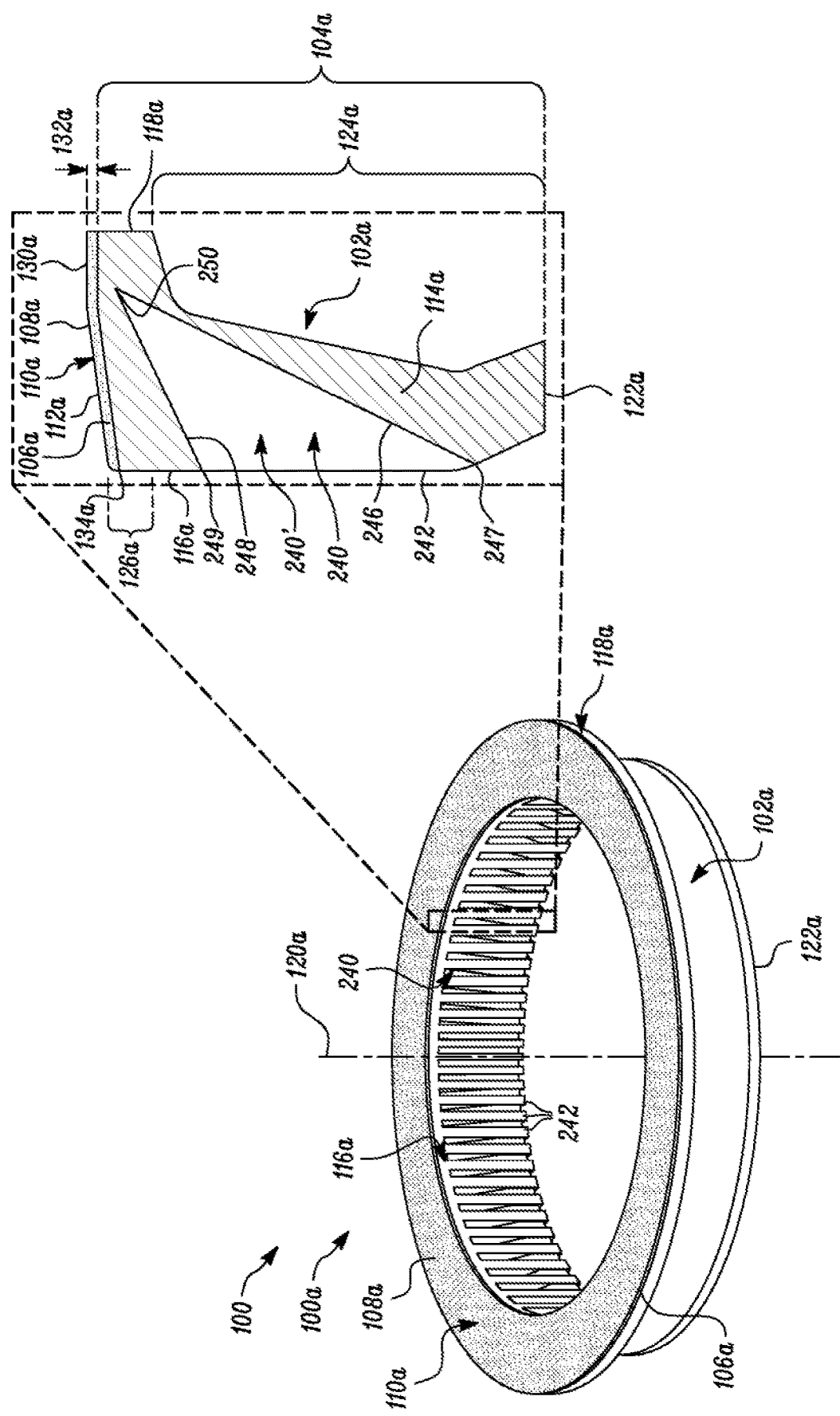
FIG. 1 illustrates a perspective view of an exemplary seal, in accordance with an embodiment of the present disclosure.

The present disclosure relates to a seal and a method for manufacturing the seal for use in various machines. FIG. 1 illustrates an exemplary seal 100 according to an embodiment of the present disclosure. The seal 100 may be a stationary seal or a moveable seal that can be used in various types of machines, such as, track-type machines used for excavation and material moving, mining trucks, and other trucks used for hauling, material handling, farming, forestry, etc. A stationary seal may be fixed relative to a non-moving or non-rotating machine part, such as a shaft supporting an idler roller of a propulsion track. A moveable seal may be fixed relative to a second machine part, such as a track idler roller, which is rotatable relative to the non-moving machine part.

Figure 2:
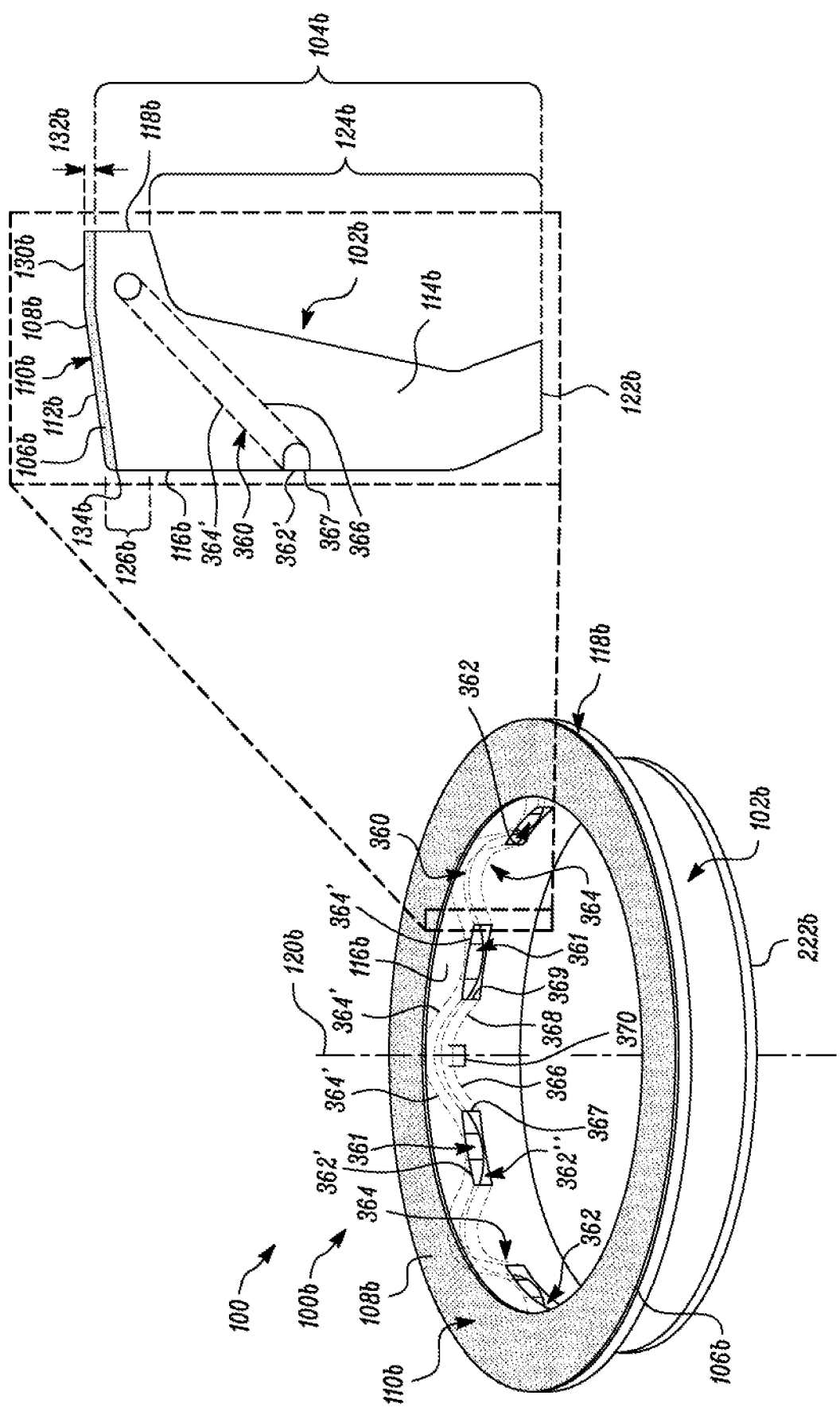
FIG. 2 illustrates a perspective view of the seal, in accordance with an alternative embodiment of the present disclosure.

FIG. 1 illustrates an embodiment of seal 100 wherein the seal 100 is embodied as seal 100*a*, and FIG. 2 illustrates another embodiment of seal 100 wherein seal 100 is embodied as seal 100*b*. With the exception of channels 240 of seal 100 embodied as seal 100*a* as shown in the embodiment as illustrated in FIG. 1 and channels 360 of seal 100 embodied as seal 100*b* as shown in the embodiment as illustrated in FIG. 2 and further discussed herein, the seal 100*a* may be identical to, or may be substantially identical to the seal 100*b*. As such, unless otherwise noted, elements, features, and other characteristics as discussed herein which common to and shared by both of seal 100 embodied as seal 100a as well as seal 100 embodied as seal 100b will include corresponding reference numbers (except that reference characters "a" and "b" will be used to identify or designate seal 100a of FIG. 1 and seal 100b of FIG. 2, respectively) and will be discussed with reference to both of FIG. 1 and FIG. 2.

Referring to FIG. 1 and FIG. 2, seal 100 (100a, 100b) can be annular or ring shaped, and may be a rigid, face-type seal, such as a Heavy Duty Dual Face seal. Additionally. or alternatively, seal 100 (100a, 100b), may be embodied as Duo-Cone™ seal, as produced by Caterpillar Inc., or other similar type seal. The seal 100 (100a, 100b) can be defined as and/or fabricated as an integrally formed, solid, unitary, and annular seal body 102a, 102b. In particular, the seal 100 (100a, 100b), and the seal body 102a, 102b thereof, is formed to include a main seal body portion 104a, 104b and an outer seal layer 106a, 106b, which define and/or compose the integrally formed, solid, unitary, and annular seal body 102a, 102b. The outer seal layer 106a, 106b of the annular seal body 102a, 102b includes and defines a seal face surface 108a, 108b, which can include an outer seal band 130a, 130b, as further discussed herein, at a sealing end 110a, 110b of the seal 100 (100a, 100b) and the annular seal body 102a, 102b thereof. The seal face surface 108a, 108b of the outer seal layer 106a, 106b, and the outer seal band 130a, 130b thereof, is configured to interact with, engage, and maintain a sealing interface or engagement with an adjacent, facing component or surface thereof which the seal face surface 108a, 108b (and the outer seal band 130a, 130b thereof) of the outer seal layer 106a, 106b contacts. As further discussed herein, the seal 100 (100a, 100b) can be fabricated such that the outer seal layer 106a, 106b (and seal face surface 108a, 108b) is composed of a first material 112a, 112b and the main seal body portion 104a, 104b is composed of a second or main seal body material 114a, 114b.

The seal 100 (100a, 100b), and the seal body 102a, 102b thereof, can include an inner circumference 116a, 116b and an outer circumference 118a, 118b defined around a center axis 120a, 120b of the seal 100 (100a, 100b). The seal 100 (100a, 100b), and seal body 102a, 102b thereof, can extend axially about the center axis 120a, 120b from a first outer axial end 122a, 122b to a second outer axial end, defined as the sealing end 110a, 110b of the seal 100 (100a, 100b). The annular seal body 102a, 102b can be defined as a solid, unitary body which includes a first section 124a, 124b and a second section 126a, 126b. In one embodiment, as shown in FIG. 1, the first section 124a, 124b can extend axially from the first outer axial end 122a, 122b of the seal body 102a, 102b to the second section 126a, 126b, wherein one or more inner surfaces of the first section 124a, 124b can define, at least in part, the inner circumference 116a, 116b of the seal 100 (100a, 100b). The second section 126a, 126b can extend laterally or radially outward from the axially-extending first section 124a, 124b and the center axis 120a, 120b to the outer, radially-extending seal face surface 108a, 108b which defines the second outer axial end or sealing end 110a, 110b of the formed seal 100 (100a, 100b). The second section 126a, 126b can also extend radially outward from the first section 124a, 124b and/or the inner circumference 116a, 116b of the seal body 102a, 102b to define, in part, the outer circumference 118a, 118b of the seal 100 (100a, 100b), or at least the outermost portion or extension thereof.

In one embodiment, the first section 124a, 124b, or at least the one or more inner surfaces thereof which may partially form the inner circumference 116a, 116b of the seal body 102a, 102b may be substantially axially aligned with the center axis 120a, 120b as it extends from the first outer axial end 122a, 122b to the second section 126a, 126b. The meaning of the term "substantially" as within, as well as the phrase "substantially axially aligned with the center axis 120a, 120b" as disclosed within an embodiment as within, as well as, the phrase "substantially axially along and with respect to the center axis 120a, 120b" means that one or more of the first section 124a, 124b and the one or more inner surfaces first section 124a, 124b which may partially form the inner circumference 116a, 116b of the seal body 102a, 102b are oriented at an angle within a range of between 0° (i.e., parallel) to +/−40° with respect to the center axis 120a, 120b. Furthermore, or in an additional embodiment, the second section 126a, 126b may extend laterally or radially outward from the axially-extending first section 124a, 124b and the center axis 120a, 120b such that an outer cross-sectional profile of the seal 100 (100a, 100b), and the seal body 102a, 102b thereof, may include a substantially "L-shaped" outer cross-sectional profile. For the purposes of applicable embodiments of the present disclosure, the "substantially 'L' shaped outer cross-sectional profile" of the seal body 102a, 102b as defined by (and between) the first section 124a, 124b and the second section 126a, 126b means that the second section 126a, 126b extends radially outward from the center axis 120a, 120b and beyond the axially-extending first section 124a, 124b at one end (the sealing end 110a, 110b) of the seal body 102a, 102b the axially-extending first section 124a, 124b and the center axis 120a, 120b and an angle between the seal face surface 108a, 108b of the second section 126a, 126b (which defines the second or sealing end 110a, 110b of the seal body 102a, 102b) and the inner circumference 116a, 116b of the seal body 102a, 102b of 90°, or proximate to 90° in a value range of between 90° to 110°.

Furthermore, the seal face surface 108a, 108b of the outer seal layer 108a, 108b, can be, or can include, a substantially flat surface, and for the purposes of the present disclosure, the "substantially flat surface" of the seal face surface 108a, 108b of the outer seal layer 108a, 108b means that at least an outer radial portion, or seal band 130a, 130b, of the seal face surface 108a, 108b, which defines an outermost (with respect to the center axis 120a, 120b), radially extending circumferential surface of the outer seal layer 108a, 108b and the sealing end 110a, 110b of the seal body 102a, 102b, positioned directly adjacent to and including and/or defining the outer circumference 118a, 118b of the seal 100 (100a, 100b) is a surface which extends uniformly along a plane oriented orthogonally, or at a 90° angle with respect to the center axis 120a, 120b of the seal 100 (100a, 100b).

As discussed above and as further disclosed herein, the seal body 102a, 102b of the seal 100 (100a, 100b), as formed, includes a first portion which is defined as the outer seal layer 106a, 106b, and additionally includes a second or main seal body portion 104a, 104b. The first portion or outer seal layer 106a, 106b, and the layer of first material 112a, 112b of which the outer seal layer 106a, 106b is composed, is included in the seal body 102a, 102b such that the seal body 102a, 102b includes the layer of first material 112a, 112b as an outer layer of material which is at, and forms, the sealing end 110a, 110b of the seal 100 (100a, 100b), and the seal face surface 108a, 108b is defined and formed as the outer surface of the outer seal layer 106a, 106b, and the layer of first material 112a, 112b thereof, at the sealing end 110a, 110b of the seal 100 (100a, 100b). As such, the first portion or outer seal layer 106a, 106b, and the layer of first material 112a, 112b of which the outer seal layer 106a, 106b is composed, is positioned and fabricated as an integral, constituent portion of the seal 100 (100a, 100b) to form at least an outermost portion of the second section 126a, 126b of the annular seal body 102a, 102b proximate to, including, and forming the sealing end 110a, 110b of the seal 100 (100a, 100b) and the seal body 102a, 102b thereof. The outer seal layer 106a, 106b, and the layer of first material 112a, 112b thereof, can also include and/or can be formed as an integral portion of the annular seal body 102a, 102b having a thickness 132a, 132b extending axially from the seal face surface 108a, 108b which defines the sealing end 110a, 110b of the seal body 102a, 102b to an inner, terminal end 134a, 134b of the outer seal layer 106a, 106b. The thickness 132a, 132b of the layer of first material 112a, 112b may be defined by the one or more materials and/or substances and material composition of the layer of first material 112a, 112b, as further discussed herein. In one embodiment, the first portion or outer seal layer 106a, 106b, and the layer of first material 112a, 112b of which the outer seal layer 106a, 106b, is composed may include a thickness 132a, 132b of between 100 microns to 500 microns.

The second or main seal body portion 104a, 104b of the seal 100 (100a, 100b) thus can include, and can be defined as extending along and throughout, and forming the remainder of the seal body 102a, 102b from the first outer axial end 122a, 122b of the seal body 102a, 102b to the inner, terminal end 134a, 134b of the outer seal layer 106a, 106b opposite the sealing end 110a, 110b and seal face surface 108a, 108b thereof. As provided above, the second or main seal body portion 104a, 104b, which is composed of and formed from a second or main seal body material 114a, 114b, and as such, in one embodiment, upon formation of the outer seal layer 106a, 106b, the second or main seal body portion 104a, 104b can include and form the remaining portion and/or portions of the seal body 102a, 102b such that the first section 124a, 124b of the seal body 102a, 102b and a portion of the second section 126a, 126b extending from the first section 124a, 124b to the inner, terminal end 134a, 134b of the outer seal layer 106a, 106b opposite the sealing end 110a, 110b are composed of and formed from the second or main seal body material 114a, 114b of the main seal body portion 104a, 104b.

The first material 112a, 1212b, of which the outer seal layer 106a, 106b (and seal face surface 108a, 108b) is formed, is composed of and/or includes one or more materials and/or substances such that the first material 112a, 112b includes a material composition having and/or exhibiting properties including, in part, at least one of, or one or more of, high hardness, high wear-resistance, a low coefficient of friction, low thermal diffusibility, and high strength, as further disclosed herein. In addition, the second or main seal body material 114a, 114b, of which the main seal body portion 104a, 104b is formed, is composed of and/or includes one or more materials and/or substances such that the main seal body material 114a, 114b includes a material composition having and/or exhibiting properties including, in part, at least one of, or one or more of, high compressive strength, toughness, hardness, manufacturability, and low cost, as further disclosed herein.

It is to be understood that the terms "first", "second", and "material" as associated with the first material 112a, 112b of the outer seal layer 106a, 106b and the second or main seal body material 114a, 114b of the main seal body portion 104a, 104b are not meant to be construed or interpreted as limiting either the outer seal layer 106a, 106b or the main seal body portion 104a, 104b, or both, as consisting solely of a single material. Instead, such terms are used for the purposes of the present disclosure solely in order to differentiate and designate the outer seal layer 106a, 106b as being formed from and/or including at least one, or one or more, material(s), substance(s), composition(s), and property(ies) which is (or are) different from that (or those) of the main seal body portion 104a, 104b. As such, the first material 112a, 112b of the outer seal layer 106a, 106b and the second or main seal body material 114a, 114b of the main seal body portion 104a, 104b are meant to encompass and include any one or more, or any combination of material(s), substance(s), composition(s), and the like which may form the outer seal layer 106a, 106b, and the main seal body portion 104a, 104b, respectively, according to any one or more embodiments as disclosed herein.

In addition to the one or more material compositions and/or properties as discussed above and further disclosed herein, the second or main seal body material 114a, 114b of the main seal body portion 104a, 104b, includes a material composition having and/or exhibiting properties which are conducive to the fabrication of the main seal body portion 104a, 104b as being formed to include internal features as illustrated in the embodiments of FIG. 1, namely, the channels 240 of seal 100 embodied as seal 100a as shown in the embodiment as illustrated in FIG. 1 and the channels 360 of seal 100 embodied as seal 100b as shown in the embodiment as illustrated in FIG. 2.

Referring to the embodiment illustrated in FIG. 1, the main seal body portion 104a of the seal 100a includes a plurality of equally spaced channels 240 extending into the interior of the main seal body portion 104a of the seal body 102a positioned along and throughout the inner circumference 116a of the seal 100a. In particular, each pair of successive, adjacent channels 240 of the plurality of equally spaced channels 240 defines a solid fin 242 therebetween, composed of the main seal body material 114a, to thus define the inner circumference 116a of the seal 100a as including a plurality of successive, alternating, equally spaced fins 242 and equally spaced channels 240. In one embodiment, each of the plurality channels 240 can be identical in geometry, dimensions, and shape, and additionally, each of the plurality fins 242 can be identical in geometry, dimensions, and shape. Each channel 240 can be formed as a radially extending opening or slot 240' defined and/or bounded by one or more radially extending inner walls or surfaces extending from the inner circumference 116a of the seal body 102a into the main seal body portion 104a thereof and bounded laterally by successive, adjacent fins 242. In particular, each channel 240 can include a first inner surface 246 extending into the interior of the main seal body portion 104a of the seal body 102a from a first end 247 of the first inner surface 246 and a second inner surface 248 extending into the interior of the main seal body portion 104a of the seal body 102a from a first end 249 of the second inner surface 248, wherein the second ends of the first inner surface 246 and the second inner surface 248 intersect at a terminal, internal intersection end 250 to define the radial inner boundaries of each slot 240'.

The terminal, internal intersection end 250 at which the second or terminal ends of the first inner surface 246 and the second inner surface 248 meet can be positioned within the portion of the second section 126a within the main seal body portion 104a of the seal body 102a proximate to the inner, terminal end 234a of the outer seal layer 106a as well as the outer circumference 118a of the seal body 102a and further positioned proximate to and aligned with the seal band 130a of the seal face surface 108a. In particular, the first end 247 of the first inner surface 246 can be positioned along the inner circumference 116a of the first section 124a of the seal body 102*a* proximate to, or alternatively, at, the first outer axial end 128*a* of the seal body 102*a*, and the first inner surface 246 can extend radially and angularly into the interior of the main seal body portion 104*a* of the seal body 102*a* from the first end 247 of the first inner surface 246 toward the outer circumference 118*a* of the seal body 102*a* to intersect with the terminal, inner end of the second inner surface 248 at the terminal, internal intersection end 250.

The first end 249 of the second inner surface 248 can be positioned along the inner circumference 116*a* of an end of the main seal body portion 104*a* opposite the first outer axial end 128*a* of the seal body 102*a* and proximate to the inner, terminal end 134*a* of the outer seal layer 106*a*. In one embodiment, the first end 249 of the second inner surface 248 can be positioned along the inner circumference 116*a* of the portion of the second section 126*a* of the seal body 102*a* within the main seal body portion 104*a* of the seal body 102*a*. Alternatively, the first end 249 of the second inner surface 248 can be positioned along the inner circumference 116*a* of an end portion of the first section 124*a* opposite the first outer axial end 122*a* of the seal body 102*a* and proximate to the second section 126*a* of the seal body 102*a*, or alternatively, at, the first outer axial end 122*a* of the seal body 102*a*. The second inner surface 248 can extend radially and angularly into the interior of the main seal body portion 104*a* of the seal body 102*a* from the first end 249 of the second inner surface 248 toward the outer circumference 118*a* of the seal body 102*a* to intersect with the terminal, inner end of the first inner surface 246 at the terminal, internal intersection end 250.

In use, the seal 100*a* according to the embodiment illustrated in FIG. 1 may be incorporated into a mechanical system to form and maintain an outer sealing interface, and in certain applications, may form a rotatable, sealing engagement and interface (about the center axis 120*a* of the seal 100*a*) with an adjacent, facing component or surface thereof which the outer seal band 130*a* of the seal face surface 108*a* contacts proximate to the outer circumference 118*a* of the seal 100*a*, while the inner circumference 116*a* of the seal 100*a* may be at least partially submerged within or otherwise exposed to rotatably interact with and retain a lubricant fluid within an internal environment of the system. The mechanical, and in some applications, rotatable, mechanical sealing engagement between the adjacent, facing component or surface thereof which the outer seal band 130*a* of the seal face surface 108*a* contacts, and the frictional forces applied to and experienced by the seal face surface 108*a* as a result of such mechanical sealing contact, may result in the generation of heat within the seal face surface 108*a*, at, and proximate to the outer seal band 130*a*. In addition to forming and maintaining a sealing interface, the seal 100*a*, and the features thereof as disclosed herein, according to the embodiment illustrated in FIG. 1 may be further configured to cool and dissipate such heat which may be generated within the seal face surface 108*a*, at, and proximate to the outer seal band 130*a*. Specifically, the plurality of successive, alternating, equally spaced fins 242 and equally spaced channels 240 positioned along and throughout the inner circumference 116*a* of the seal 100*a* may cooperatively engage, retain, circulate, and mechanically and fluidly direct the lubricant fluid into each radially extending opening or slot 240' extending into the interior of the main seal body portion 104*a* of the seal body 102*a* as each channel 240 passes through or otherwise engages or comes into contact with the lubricant fluid such that the lubricant fluid is directed to the terminal, internal intersection end 250 of each slot 240' and in thermal proximity to the seal face surface 108*a* of the of the outer seal layer 106*a* (as well as the seal band 130*a* thereof) to thermally engage and absorb the heat which may be generated within the seal face surface 108*a*, at, and proximate to the outer seal band 130*a*. Such thermal engagement may result in the transfer of heat from within the seal face surface 108*a* to the lubricant fluid which may thus effectuate cooling of the seal face surface 108*a* and the outer seal band 130*a* thereof.

Additionally, in embodiments wherein the seal 100*a* may form a rotatable, sealing engagement and interface (about the center axis 120*a* of the seal 100*a*) with an adjacent, facing component or surface thereof each of the plurality of successive, alternating, equally spaced fins 242 and channels 240 positioned along and throughout the inner circumference 116*a* of the seal 100*a* may interact with and engage the lubricant fluid to "pump" or otherwise cooperatively, mechanically, and rotationally retain, circulate, and mechanically and fluidly direct the lubricant fluid to, along, and throughout the entirety of the circumference of the seal face surface 108*a* and the outer seal band 130*a* thereof as the seal 102*a* rotates about its center axis 120*a*.

Referring to seal 100 embodied as seal 100*b* as illustrated in FIG. 2, the main seal body portion 104*b* of seal 100*b* includes a continuous, internal channel 360 defined within and extending continuously throughout the circumference of the main seal body portion 104*b* of the seal body 102*b*. The internal channel 360, and an open interior 361 thereof, can be formed within the main seal body portion 104*b* and defined as following a consistent, repeatable, serpentine path which successively alternates to extend between each of a plurality of channel openings 362 defined within, and positioned at equally spaced intervals along, the inner circumference 116*b* of the main seal body portion 104*b*, and the outer circumference 118*b* of the seal body 102*b* proximate to the seal face surface 108*a*. In particular, the internal channel 360 can include and be defined by a plurality of identical, successive, interconnected, curvilinear or serpentine sections 364 which interconnect to form the continuous, internal channel 360 which extends along and throughout the radial circumference of the main seal body portion 104*b* of the seal body 102*b*. Given that each of the sections 364 which interconnect to form the continuous, internal channel 360 are identical, only one section 364' will be discussed for the purposes of the present disclosure.

Each section (depicted as exemplary section 364') of the plurality of sections 364 includes a first channel segment 366 and a second channel segment 368. The first channel segment 366 can include a first end 367 which connects to a first end of an immediately preceding, successive second channel segment (in a manner consistent with and identical to the first end 369 of the second channel segment 368) at a first channel opening 362' of the plurality of channel openings 362 formed within the inner circumference 116*b* of the main seal body portion 104*b* such that the first end 367 connects the interior 361 of the internal channel 360 in communication with the first channel opening 362' at the inner circumference 116*b* of the main seal body portion 104*b*. The second channel segment 368 can include a first end 369 which connects to a first end of an immediately following or subsequent successive first channel segment (in a manner consistent with and identical to the first end 367 of the first channel segment 366) at an adjacent, next, or immediately successive, evenly spaced second channel opening 362" of the plurality of channel openings 362 from and with respect to the first channel opening 362'. Similarly, the first end 369 of the second channel segment 368 connects the interior 361 of the internal channel 360 in communication with the second channel opening 362" at the inner circumference 116b of the main seal body portion 104b. The first channel segment 366 can extend radially and angularly from its first end 367 into the interior of the main seal body portion 104b of the seal body 102b toward the outer circumference 118b of the seal body 102b and additionally extends along a portion of the arc of the circumference of the seal body 102b toward the second channel segment 368, and the second channel segment 368 can extend radially and angularly from its first end 369 into the interior of the main seal body portion 104b of the seal body 102b toward the outer circumference 118b of the seal body 102b and additionally extends along a portion of the are of the circumference of the seal body 102b toward the first channel segment 366 such that the second ends of the first channel segment 366 and the second channel segment 368 connect at an outer channel segment 370. The outer channel segment 370 can connect the first channel segment 366 in communication with the second channel segment 368 (and the portions of the interior 361 of the channel 360 defined thereby) and can be positioned between immediately successive, adjacent first and second channel openings 362', 362" within the portion of the second section 126b within the main seal body portion 104b of the seal body 102b proximate to the inner, terminal end 134b of the outer seal layer 106b as well as the outer circumference 118b of the seal body 102b and further positioned proximate to and aligned with the seal band 130b of the seal face surface 108b.

The seal 102b, and the features thereof as disclosed herein according to the embodiment illustrated in FIG. 2 may be configured to cool and dissipate heat which may be generated within the seal face surface 108b, at, and proximate to the outer seal band 130b. Specifically, the plurality of channel openings 362 defined within, and positioned at equally spaced intervals along the inner circumference 116b of the main seal body portion 104b may direct lubricant fluid into the interior 361 of the channel 360 such that the lubricant fluid is fluidly communicated and circulated into and through the plurality of sections 364, 364' and directed through each outer channel segment 370 and in thermal proximity to the seal face surface 108b of the of the outer seal layer 106b (as well as the seal band 130b thereof) to thermally engage and absorb the heat which may be generated within the seal face surface 108b, at, and proximate to the outer seal band 130b. Such thermal engagement may result in the transfer of heat from within the seal face surface 108b to the lubricant fluid which may thus effectuate cooling of the seal face surface 108b and the outer seal band 130b thereof. Additionally, in embodiments wherein the seal 102b may form a rotatable, sealing engagement and interface (about the center axis 120b of the seal 100b) with an adjacent, facing component or surface thereof, the plurality of equally spaced channel openings 362 may fluidly interact with the sections 364, 364' of the channel 360 to engage the lubricant fluid to "pump" or otherwise cooperatively, mechanically, and rotationally and fluidly direct, communicate, and circulate the lubricant fluid from the inner circumference 116b of the seal body 102b, into and through the interior 361 of the channel 360, throughout the entirety of the circumference of the seal body 102b as the seal 102b rotates about its center axis 120b such that the lubricating fluid is directed to flow, in part, through each outer channel segment 370 and in thermal proximity to effectuate cooling of the seal face surface 108b of the of the outer seal layer 106b (as well as the seal band 130b thereof).

The seal 100 (100a, 100b) as well as the elements, features, and components thereof, can be manufactured via any or more of the processes and steps according to any one or more of the embodiments as disclosed herein. In particular, the seal 100 (100a, 100b), and the portions thereof, namely, the first portion or outer seal layer 106a, 106b, and the second or main seal body portion 104a, 104b can be manufactured and formed via two distinct and/or separate processes (as well as the one or more steps of each), as further disclosed herein. In one embodiment, the first portion or outer seal layer 106a, 106b of the seal body 102a, 102b of the seal 100 (100a, 100b) can be formed or manufactured by the one or more steps of a first process, and the second or main seal body portion 104a, 104b of the seal body 102a, 102b of the seal 100 (100a, 100b) can be formed by the one or more steps of a second process. In one embodiment, the first process, or at least a portion thereof, may precede the second process.

In particular, in one embodiment, the first process can include a metal additive manufacturing process, or a first metal additive manufacturing process, as well as the steps thereof as disclosed herein, to form the first portion or outer seal layer 106a, 106b of the seal body 102a, 102b of the seal 100 (100a, 100b), as well as to form the composition of the first material 112a, 112b of which the outer seal layer 106a, 106b is formed. The second process employed to manufacture or fabricate the main seal body portion 104a, 104b of seal 100 to include, in part, the internal features thereof which can include the channels 240 of seal 100 embodied as seal 100a as shown in the embodiment illustrated in FIG. 1 or those of the channel 360 of seal 100 embodied as seal 100b shown in the embodiment as illustrated in FIG. 2 as discussed above, can include a second metal additive manufacturing process. Alternatively, the second process may include a casting process.

In addition, and more specifically, to form the outer seal layer 106a, 106b of the seal 100 (100a, 100b), the first process, which can be defined as the first metal additive manufacturing process, can include metal additive manufacturing process or steps as discussed further herein, can be used to form the outer seal layer 106a, 106b. In particular, in one embodiment, the first material 112a, 112b includes a high-speed molybdenum tool steel (M2-tool steel) metal throughout the entirety of the thickness 134a, 134b of the first material 112a, 112b which forms outer seal layer 106a, 106b according to the steps of the first process according to any one or more of the embodiments as disclosed further herein. In addition, the first material 112a, 112b of the outer seal layer 106a, 106b can include a material composition which is compatible with the second or main seal body material 114a, 114b of the main seal body portion 104a, 104b (and vice versa) such that the first material 112a, 112b is completely, compatibly, and/or integrally or otherwise inseparably bonded with the main seal body material 114a, 114b during fabrication and in use (including, at least in part, along the interface between the inner, terminal end 134a, 134b of the outer seal layer 106a, 106b and the main seal body portion 104a, 104b) to form the seal 100 (100a, 100b) as including the outer seal layer 106a, 106b and main seal body portion 104a, 104b as an integrally formed, solid, unitary, and annular seal body 102a, 102b.

Additionally, the second or main seal body material 114a, 114b of the main seal body portion 104a, 104b, which includes, a metal (or metal alloy) which correspondingly forms a complete, integral bond with the first material 112a, 112b of the outer seal layer 106a, 106b. As provided above, and further provided herein, the first material 112a, 112b which forms the outer seal layer 106a, 106b is a material which is defined as including, at least in part, high hardness, a low coefficient of friction, and high wear-resistance, which, in an exemplary embodiment, is M2-tool steel. In one embodiment, the second or main seal body material 114a, 114b of the main seal body portion 104a, 104b can include and be formed of Copper. or alternatively, hardened stainless steel, such as 17-4 stainless steel, which forms a complete, integral bond with the first material 112a, 112b of the outer seal layer 106a, 106b, exhibits properties including, in part, at least one of, or one or more of, high compressive strength, toughness, and hardness, and further is suited to, compatible with, or is otherwise capable of being employed to form the main seal body portion 104a, 104b of seal 100 as including, in part, the internal features thereof which can include the channels 240 of seal 100 embodied as seal 100a and the channel 360 of seal 100 embodied as seal 100b as illustrated in FIG. 1 and FIG. 2, respectively, via the second process, which can be defined as a second metal additive manufacturing process. Notwithstanding, it should be understood that the foregoing disclosure is meant to constitute only one exemplary embodiment of the present disclosure, as any one or more other materials, metals, and/or metal alloys can be employed and included to form the first material 112a, 112b and/or the second or main seal body material 114a, 114b which be suitable to meet any one or more of the characteristics or properties as disclosed herein. Furthermore, any and all of such other materials, metals, and/or metal alloys shall be included as falling within the scope of the present disclosure, as the benefit of the disclosure, knowledge, and teaching of the present disclosure is required for the appropriate selection of such other suitable materials, metals, and/or metal alloys.

INDUSTRIAL APPLICABILITY

The seal 100 according to any one or more of the embodiments as disclosed herein may be incorporated and utilized in any of a variety of systems, environments, and/or applications to sealingly engage another component, which may be a mechanical system component and/or another seal. In particular, and in addition to further advantages, the seal 100, which may be manufactured via any one or more of the methods as disclosed herein, may include an outer seal layer and a seal face surface thereof which may be fabricated to include a more complete, consistent, and/or greater composition of a hardness and/or wear resistance imparting element therein. In addition, the seal 100 according to any one or more of the embodiments as disclosed herein may include internal features which may more effectively cool and dissipate heat which may be generated in connection with the sealing engagement between the seal face surface of the seal 100 and an adjacent, facing component or surface thereof. Furthermore, the seal 100 may be fabricated via one or more processes and/or materials as discussed herein such that the body which may form the seal may include layers which may be completely, compatibly, and/or integrally or otherwise inseparably bonded.

Figure 3:
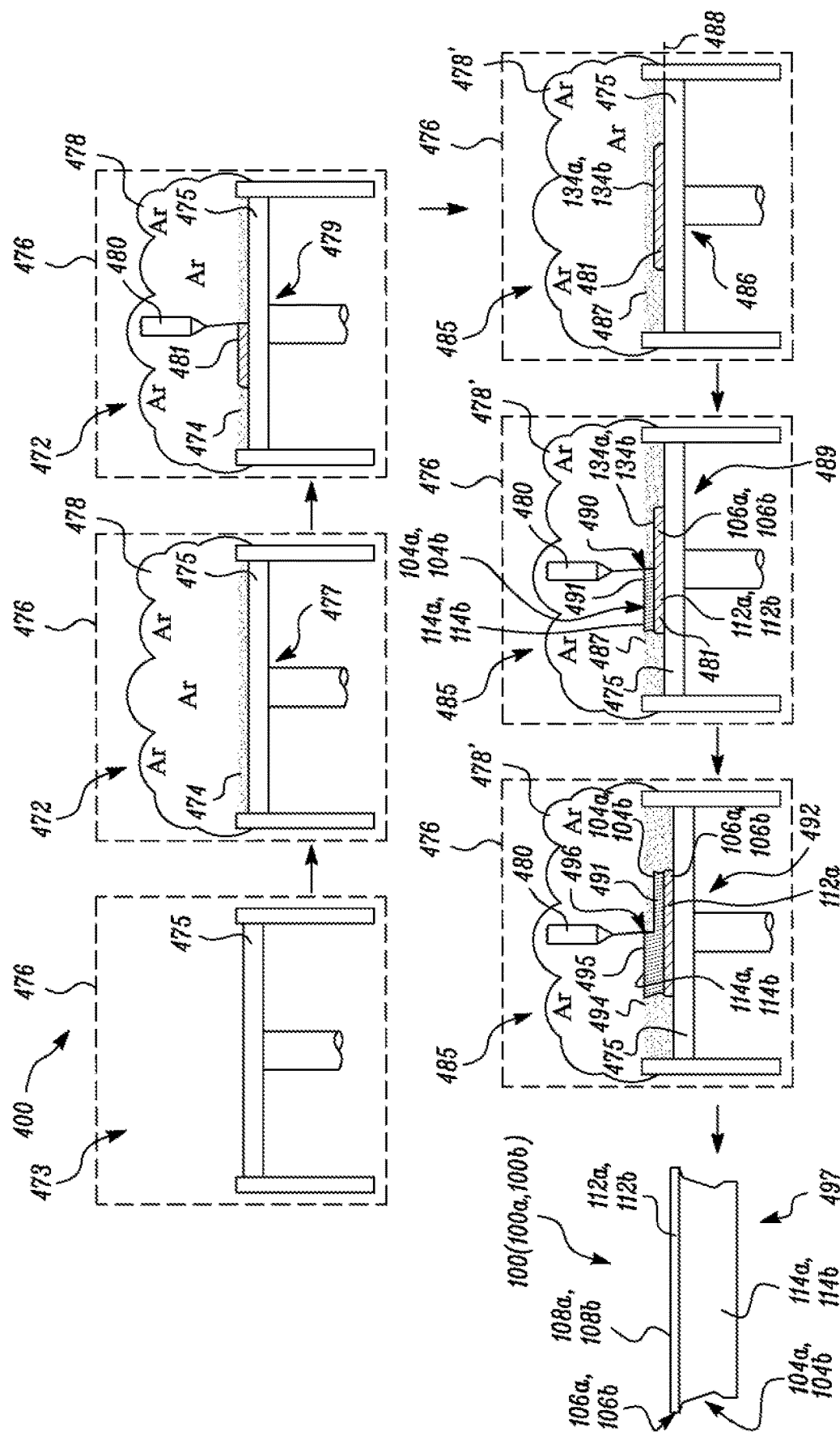
FIG. 3 is a diagrammatic representation of a process flow illustrating the method of manufacturing the seal, in accordance with the concepts of the present disclosure.

FIG. 3 illustrates a process flow diagram 400 depicting one embodiment of a method and process for manufacturing the seal 100 (100a, 100b) according to any one or more of the embodiments as disclosed herein. In particular. FIG. 3, and the process flow diagram 400 illustrated therein, depicts a first process 472, as including steps 477, and 479 which can include, in part, a first metallic additive manufacturing process, utilized to form the outer seal layer 106a, 106b of the seal 100 (100a, 100b) as being formed of the first material 112a, 112b, and additionally depicts the steps of a second process 485, which can be defined as and/or include a second metallic additive manufacturing process, utilized to form the or main seal body portion 104a, 104b of the seal 100 (100a, 100b) as being formed of the main seal body material 114a, 114b. FIG. 3, and the process flow diagram 400 illustrated therein, depicts the first process 472 and the second process 485 as utilizing, in part, metallic additive manufacturing processes each embodied as powder bed fusion process. However, it is to be understood that the process embodied in FIG. 3 and discussed herein is not meant to be limiting, as one or more other metallic additive manufacturing processes and/or other process types (or a combination thereof) may be used to form the seal 100 (100a, 100b).

Referring to FIG. 3, the method and process for manufacturing the seal 100 (100a, 100b) begins at step 473 with the placement of a metal base plate 475 within a closed chamber 476 in order to maintain a specified, controlled atmosphere therein during each of the steps of the formation of the seal 100 (100a, 100b) as discussed below. Referring to FIG. 3 (and with continued reference to FIG. 1 and FIG. 2), the first process 472 begins at step 477 with the deposition of a layer of powdered metal 474 upon the metal base plate 475 within the closed chamber 476 while maintaining an inert gas atmosphere 478. In one embodiment, the inert gas atmosphere 478 can be an atmosphere comprising Argon (Ar) which is maintained within the closed chamber 476 during the deposition of a layer of powdered metal 474 upon the metal base plate 475. It is to be understood, however, that the scope of the disclosure is not limited to maintaining the atmosphere of Argon as the inert gas atmosphere 478, as any other suitable inert gas may be used. As such, the inert gas atmosphere 478 maintained in the closed chamber 476 can include, but is not limited to, an Argon gas atmosphere, both for the present step as well as the remaining steps discussed herein within which and during which the inert gas atmosphere 478 is maintained. The metal base plate 475 may be defined as a metal substrate upon which the 3D printed seal 100 (100a, 100b) (and, more specifically, in the present embodiment, the outer seal layer 106a, 106b (including the seal face surface 108a, 108b thereof)) is formed. The metal base plate 475 is formed of the same material as, and, in one embodiment, can form, at least a part of the outer seal layer 106a, 106b, and, as such, the metal base plate 475 is formed of a material which is the same of that of the outer seal layer 106a, 106b as well as that of the layer of powdered metal 474, and, as such, is defined as including, at least in part, high hardness, a low coefficient of friction, and high wear-resistance, which, in an exemplary embodiment, is M2-tool steel. Following the deposition of the layer of powdered metal 474 as discussed above, the first process 472 progresses to step 479, which may be defined as a sintering step or process, during which a laser 480 applies heat to the deposited layer of powdered metal 474 within the inert gas atmosphere 478 to melt the layer of powdered metal 474 to form a formed, hardened metal layer 481 upon the cooling and solidification of the layer of powdered metal 474 melted via the laser 480. The layer of powdered metal 474 is deposited to a predetermined thickness in step 477 such that the formed, hardened metal layer 481 is formed to a corresponding predetermined thickness in step 479. The corresponding predetermined thickness of formed, hardened metal layer 481 can be based upon a variety of factors, which can include, in part, factors attendant to the structural composition and consistency of the formed, hardened metal layer 481. To provide one non-limiting example, in one embodiment, the layer of powdered metal 474 is deposited to a predetermined thickness in step 477 such that the formed, hardened metal layer 481 is formed to a corresponding predetermined thickness of between 1-3 millimeters in step 479.

A single iteration or performance of the first process 472 which includes steps 477, and 479 may result in the formation of the resultant hardened metal layer 481 having a thickness equivalent to the thickness 132a, 132b of the outer seal layer 106a, 106b to thus form the entirety of the outer seal layer 106a, 106b, and the first material 112a, 112b thereof. However, depending upon the intended thickness 132a, 132b of the outer seal layer 106a, 106b, the performance of steps 477, and 479 may be repeated in a manner identical as described above, except that instead of depositing a layer of powdered metal 474 upon the metal base plate 475 as described in step 477 above, any one or more subsequent iterations of steps 477, and 479 may involve a modification to step 477 which may include a lowering of the metal base plate 475 and the deposition of an additional layer of powdered metal 474 upon the upper or top outer surface of the metal layer 481 formed via a preceding performance of steps 477, and 479 until the overall thickness of the resultant layer of metal layer 481 has a thickness equivalent to the desired thickness 132a, 132b of the outer seal layer 106a, 106b.

Referring to FIG. 3 (and with continued reference to FIG. 1 and FIG. 2), the first process 472 thus can conclude with step 479 to result in the completed formation of the metal layer 481 as forming and/or defining the dimensions and features of the outer seal layer 106a, 106b as well as the composition of the first material 112a, 112b, wherein the interface between the metal layer 481 and the upper or outer surface of the metal base plate 475 (upon removal of the formed seal 100 (100a, 100b) from the metal base plate 475) can define and/or form the seal face surface 108a, 108b, which can include the outer seal band 130a, 130b, and the sealing end 110a, 110b of the seal 100 (100a, 100b), and the upper or top outer surface of the metal layer 481 can define and/or form the inner, terminal end 134a, 134b of the seal face surface 108a, 108b.

Still referring to FIG. 3, the process flow diagram 400 further depicts the steps of the second process 485, which can be performed to fabricate the main seal body portion 104a, 104b of the seal 100 (100a, 100b) as being formed of the main seal body material 114a, 114b. As provided above, the second process 485 can be employed to manufacture or fabricate the entirety of the main seal body portion 104a, 104b of seal 100 to include, in part, the internal features thereof which can include the channels 240 of seal 100 embodied as seal 100a as shown in the embodiment illustrated in FIG. 1 or those of the channel 360 of seal 100 embodied as seal 100b shown in the embodiment as illustrated in FIG. 2. In one embodiment, a three-dimensional model of the seal 100a as shown in the embodiment illustrated in FIG. 1 and a three-dimensional model of the seal 100b shown in the embodiment as illustrated in FIG. 2 may be stored in the memory of, electronically transmitted to, referenced by, or otherwise used by a controller (not shown). The controller may be electronically and controllably connected to the laser 480 to actuate and control the operation of the laser 480 based upon the applicable three-dimensional model to form the main body portion 104a, 104b of the seal 100 (100a, 100b) according to the second process 485 as disclosed herein, as well as, in one embodiment, additionally, to form the outer seal layer 106a, 106b of the seal 100 (100a, 100b) according to the first process 472 as discussed above. It should be understood that the process flow diagram 400 as shown in FIG. 3 is meant to provide an exemplary, schematic depiction of a method and process for manufacturing the seal 100 (100a, 100b) which is equally applicable to seal 100 embodied as seal 100a as shown in the embodiment illustrated in FIG. 1 as well as seal 100 embodied as seal 100b shown in the embodiment as illustrated in FIG. 2. As such, for the purposes of the discussion of the method and process for manufacturing the seal 100 (100a, 100b) in connection with the process flow diagram 400 as shown in FIG. 3, the use and designation of the reference characters "a" and "b" designating the seal 100a of FIG. 1 and seal 100b of FIG. 2, and the elements thereof, respectively, shall be interpreted or construed to mean that the method and process for manufacturing the seal 100 (100a, 100b) according to the first process 472 as disclosed above as well as the second process 485 as disclosed below shall be applicable to either of seal 100a or seal 100b.

In particular, further referring to FIG. 3, the second process 485 begins with step 486 includes the formation (or re-formation) of the inert gas atmosphere 478' within the closed chamber 476. Step 486 also includes the lowering of the metal base plate 475 to a position 488 which is lower than, or below the position occupied during the first process 472, and steps 477, and 479 thereof and further below the upper or top outer surface of the metal layer 481 which can define and/or form the inner, terminal end 134a, 134b of the seal face surface 108a, 108b formed via the first process 472. Upon the lowering of the metal base plate 475 to position 488, step 486 of the second process 485 progresses with the deposition of a first layer of powdered metal 487 which forms the second or main seal body material 114a, 114b of the main seal body portion 104a, 104b upon the upper or top outer surface of the metal layer 481 which can be defined as the inner, terminal end 134a, 134b of the seal face surface 108a, 108b. As provided above, the (first, next or second) layers of powdered metal 487, 494, as well as the (first, next or second) metal layers 491, 495, can be composed of copper, or alternatively, hardened stainless steel, such as 17-4 stainless steel.

Following the deposition of the first layer of powdered metal 487 as discussed above, the second process 485 progresses to step 489, which may be defined as a sintering step or process, during which a laser 480 applies heat to the deposited first layer of powdered metal 487 within the inert gas atmosphere 478' at predetermined locations 490 to melt and fuse the first layer of powdered metal 487 to form a hardened, first metal layer 491 which not only comprises and/or forms the second or main seal body material 114a, 114b, but also fuses the first metal layer 491 to the upper or top outer surface of the metal layer 481 which corresponds to the inner, terminal end 134a, 134b of the seal face surface 108a, 108b and defines an interface between the outer seal layer 106a, 106b and the second or main seal body portion 104a, 104b of the seal body 102a, 102b of the seal 100 (100a, (100b). As such, the first metal layer 491 can form a portion of the main seal body portion 104a, 104b, and the second or main seal body material 114a, 114b thereof, which is completely, compatibly, and/or integrally or otherwise inseparably bonded and fused with the metal layer 481 which defines and forms the first material 112a, 112b and the seal face surface 108a, 108b. In one embodiment, the first metal layer 491 may form the portion of the second section 126a, 126b within the main seal body portion 104a, 104b of the seal body 102a, 102b proximate to the inner, terminal end 134a, 134b of the outer seal layer 106a, 106b.

Still referring to FIG. 3, the second process 485 progresses to step 492, during which the metal base plate 475 is lowered to a next position 493 which is lower than, or below the position occupied, and the first metal layer 491 formed, during step 489, and thereafter a next or second layer of powdered metal 494 is deposited upon the first metal layer 491 formed during step 489 within the inert gas atmosphere 478' of the closed chamber 476. Thereafter, step 492 progresses with the laser 480 applying heat to the deposited next or second layer of powdered metal 494 within the inert gas atmosphere 478' at predetermined locations 496 to melt and fuse the second layer of powdered metal 494 to form a hardened, next or second metal layer 495 and integrally fuse the next or second metal layer 495 to the upper or top outer surface of the first metal layer 491 and form next or second portion of the main seal body portion 104a, 104b extending axially outward from the first metal layer 491.

The predetermined locations 490, 496 at which the laser 480 applies heat to the first and next or second layer of powdered metal 491, 494 may be based upon and/or correspond to one or more parameters, such as the coordinates, structure, and the dimensions of the three-dimensional model of the seal 100 (100a, 100b) such that the first metal layer 491 and the next or second metal layer 495 conform to, and form the seal 100 (100a, 100b) (or portions thereof) based upon and according to, the three-dimensional model of the seal 100 (100a, 100b). In particular, and as discussed above, the three-dimensional model of the seal 100a as shown in the embodiment illustrated in FIG. 1 and the three-dimensional model of the seal 100b shown in the embodiment as illustrated in FIG. 2 may include parameters, instructions, or other data descriptive of, indicative of, or characterizing the size, shape, structure, dimensions, orientations, locations, and/or features of the main seal body portion 104a, 104b of seal 100 (100a, 100b), including, in part, the internal features thereof which can include the channels 240 of seal 100 embodied as seal 100a as shown in the embodiment illustrated in FIG. 1 and those of the channel 360 of seal 100 embodied as seal 100b shown in the embodiment as illustrated in FIG. 2. The controller may reference, receive, or otherwise utilize, and may further process such parameters, instructions, or data and, in response, may actuate the laser 480 to apply heat to the first and next or second layer of powdered metal 491, 494 at the predetermined locations 490, 496, as discussed above in connection with steps 489 and 492, respectively, wherein the predetermined locations 490, 496 may correspond to the size, shape, structure, dimensions, orientations, locations, and/or features of the main seal body portion 104a, 104b of seal 100 (100a, 100b) of the three-dimensional model of the seal 100 (100a, 100b). As such, the resultant first metal layer 491 and the next or second metal layer 495 (as well as, in one embodiment, subsequent next or second metal layers 495) conform to the size, shape, structure, dimensions, orientations, locations, and/or features of the main seal body portion 104a, 104b of the seal 100 (100a, 100b) which may be based upon and according to, the three-dimensional model of the seal 100 (100a, 100b) to progressively, collectively, and ultimately form the entirety of the main seal body portion 104a, 104b of the as-formed seal 100 (100a, 100b) as including in part, the internal features thereof which can include the channels 240 of seal 100 embodied as seal 100a as shown in the embodiment illustrated in FIG. 1 or those of the channel 360 of seal 100 embodied as seal 100b shown in the embodiment as illustrated in FIG. 2.

As indicated above, step 492 may be repeated in a manner consistent with the foregoing discussion as necessary to form one or more additional, subsequent hardened, next or second metal layers consistent with next or second metal layer 495 as discussed above to progressively form next or second portions of the main seal body portion 104a, 104b extending axially outward from the previously formed first and next or second metal layer 491, 495 until the entirety of the main seal body portion 104a, 104b is formed. Thereafter, the formed seal 100 (100a, 100b), including the outer seal layer 106a, 106b formed via the first process 472 and the main seal body portion 104a, 104b formed (and integrally and/or inseparably bonded or fused to the outer seal layer 106a, 106) via the second process 485, the formed seal 100 (100a, 100b) is removed from the metal base plate 475 via any suitable removal process (e.g., via an EDM method) to provide the completed, formed seal 100 (100a, 100b) as shown in FIG. 3 at step 497.

Figure 4:
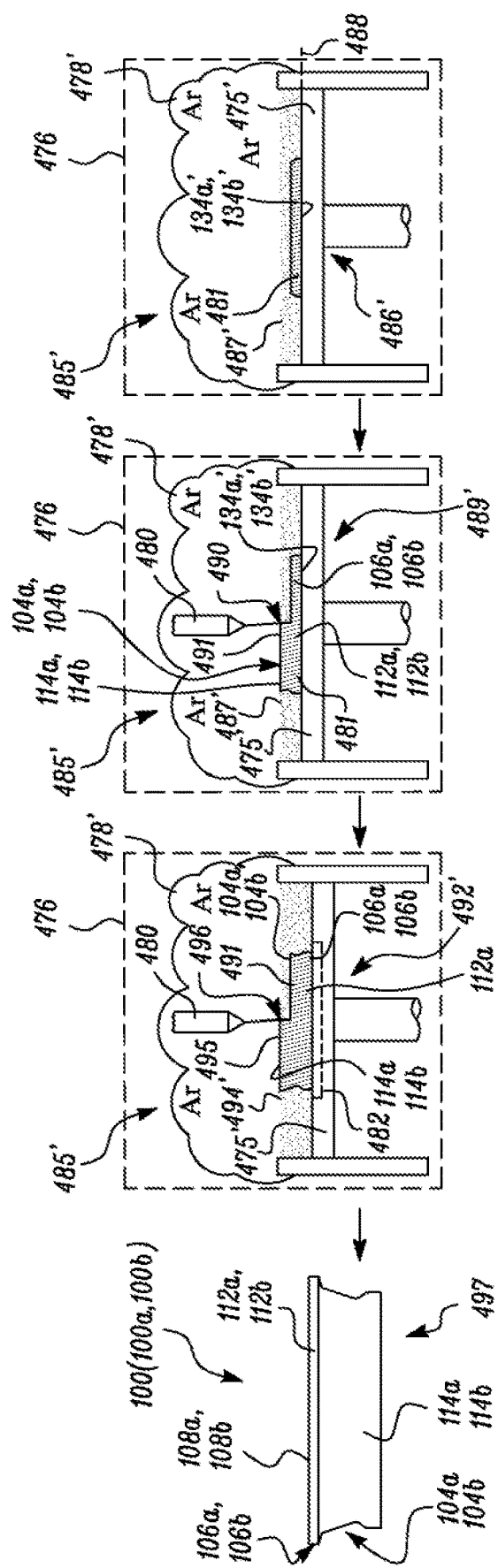
FIG. 4 is a diagrammatic representation of the process flow illustrating the method of manufacturing the seal, in accordance with an alternative embodiment of the present disclosure.

In an alternative embodiment depicted in FIG. 4, the main seal body portion 104a, 104b is formed on top of the metal base plate 475, with a portion of the metal base plate 475 forming the outer seal layer 106a, 106b of the seal 100a, 100b respectively. As described earlier, the metal base plate 475 is formed of the same material as, and, in one embodiment, can form, at least a part of the outer seal layer 106a, 106b, and, as such, the metal base plate 475 is formed of a material which is the same of that of the outer seal layer 106a, 106b as well as that of the layer of powdered metal 474, and, as such, is defined as including, at least in part, high hardness, a low coefficient of friction, and high wear-resistance, which, in an exemplary embodiment, is M2-tool steel.

In this alternative embodiment, referring to FIG. 4, the process 485' begins with step 486' and includes the formation of the inert gas atmosphere 478' within the closed chamber 476'. Step 486' also includes the positioning of the metal base plate 475' to a position 488 which can define and/or form the inner, terminal end 134a', 134b' of the seal face surface 108a, 108b of the seal 100a, 100b. Further, step 486' of the process 485' progresses with the deposition of a first layer of powdered metal 487' which forms the second or main seal body material 114a, 114b of the main seal body portion 104a, 104b upon the upper or top outer surface of the metal base plate 475' which can be defined as the inner, terminal end 134a', 134b' of the seal face surface 108a, 108b. As provided above, the (first, next or second) layers of powdered metal 487', 494', as well as the (first, next or second) metal layers 491, 495, can be composed of copper, or alternatively, hardened stainless steel, such as 17-4 stainless steel.

Following the deposition of the first layer of powdered metal 487' as discussed above, the second process 485' progresses to step 489', which may be defined as the sintering step or process, during which the laser 480 applies heat to the deposited first layer of powdered metal 487' within the inert gas atmosphere 478' at the predetermined locations 490 to melt and fuse the first layer of powdered metal 487' to form a hardened, first metal layer 491' which not only comprises and/or forms the second or main seal body material 114a, 114b, but also fuses the first metal layer 491' to the upper or top outer surface of the metal base plate 475' which corresponds to the inner, terminal end 134a', 134b' of the seal face surface 108a, 108b and defines an interface between the outer seal layer 106a, 106b and the second or main seal body portion 104a, 104b of the seal body 102a, 102b of the seal 100 (100a, 100b). As such, the first metal layer 491' can form a portion of the main seal body portion 104a, 104b, and the second or main seal body material 114a, 114b thereof, which is the metal base plate 475' that defines and forms the first material 112a, 112b and the seal face surface 108a, 108b. In one embodiment, the first metal layer 491' may form the portion of the second section 126a, 126b within the main seal body portion 104a, 104b of the seal body 102a, 102b proximate to the inner, terminal end 134a, 134b of the outer seal layer 106a, 106b.

Still referring to FIG. 4, the second process 485' progresses to step 492', during which the metal base plate 475' is lowered to a next position which is lower than, or below the position occupied, and the first metal layer 491' formed, during step 489', and thereafter a next or second layer of powdered metal 494' is deposited upon the first metal layer 491' formed during step 489' within the inert gas atmosphere 478' of the closed chamber 476. Thereafter, step 492' progresses with the laser 480 applying heat to the deposited next or second layer of powdered metal 494' within the inert gas atmosphere 478' at predetermined locations 496 to melt and fuse the second layer of powdered metal 494' to form a hardened, next or second metal layer 495 and integrally fuse the next or second metal layer 495 to the upper or top outer surface of the first metal layer 491' and form next or second portion of the main seal body portion 104a, 104b extending axially outward from the first metal layer 491'. As such, the resultant first metal layer 491' and the next or second metal layer 495 (as well as, in one embodiment, subsequent next or second metal layers 495) conform to the size, shape, structure, dimensions, orientations, locations, and/or features of the main seal body portion 104a, 104b of the seal 100 (100a, 100b) which may be based upon and according to, the three-dimensional model of the seal 100 (100a, 100b) to progressively, collectively, and ultimately form the entirety of the main seal body portion 104a, 104b of the as-formed seal 100 (100a, 100b) as including in part, the internal features thereof which can include the channels 240 of seal 100 embodied as seal 100a as shown in the embodiment illustrated in FIG. 1 or those of the channel 360 of seal 100 embodied as seal 100b shown in the embodiment as illustrated in FIG. 2

Thereafter, upon formation of main seal body portion 104a, 104b on the metal base plate 475', a remaining portion of the metal base plate 475' retained on the seal 100 (100a, 100b) is removed via any known machining or cutting process (e.g., via the EDM method) to leave a depth and width of the metal base plate 475' as forming the outer seal layer 106a, 106b as composed of the first material 112a, 112b of the metal base plate 475' as shown by the dashed lines 482, to provide the completed, formed seal 100 (100a, 100b) as shown in FIG. 4 at step 497'.

Figure 5:
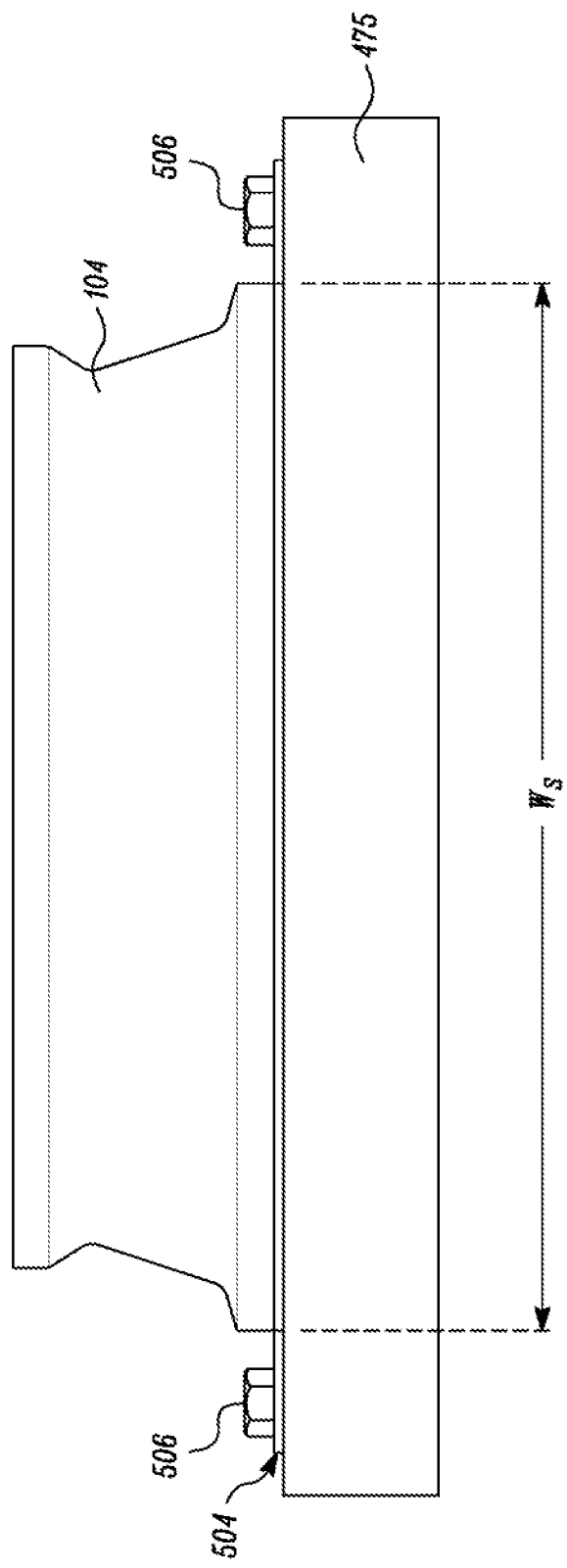
FIG. 5 illustrates a cross-sectional view of the seal manufactured on a substrate having an intermediary plate, in accordance with the concepts of the present disclosure.
Figure 6:
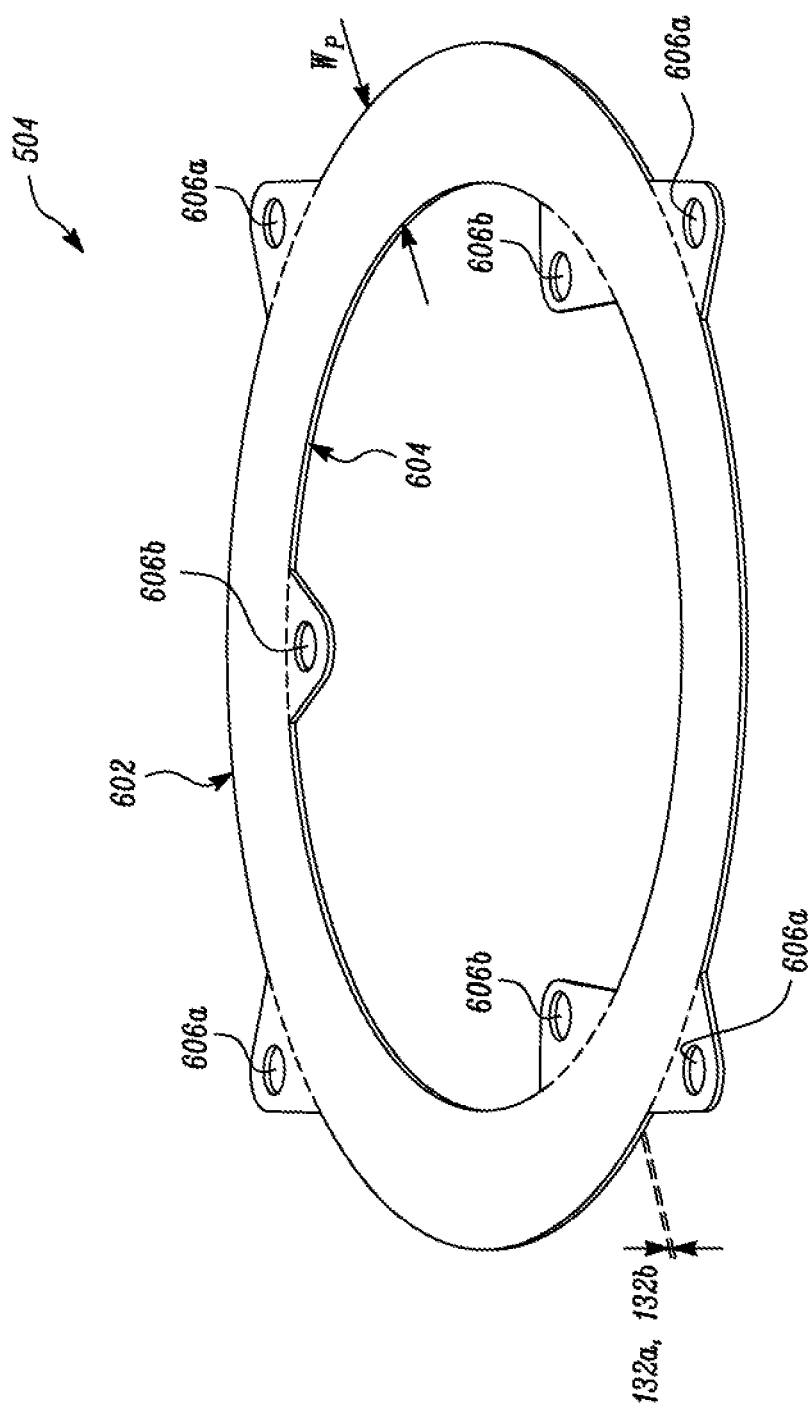
FIG. 6 illustrates a perspective view of the intermediary plate used in manufacturing the seal, in accordance with the concepts of the present disclosure.

In an alternative embodiment depicted in FIG. 5, the metal base plate 475, 475' may include a base 502 and an intermediary plate 504 detachably coupled to the base 502. The intermediary plate 504 (shown in FIG. 5) may be a ring-shaped structure having an outer circumference 602 and an inner circumference 604, such that a width $W_P$ of the intermediary plate 504 is substantially equal to or slightly greater than a desired width $W_S$ of the outer seal layer 106a, 106b of the main seal body 104a, 104b or the desired thickness 132a, 132b of the outer seal band 130a, 130b of the seal 100, embodied as seal 100a illustrated in FIG. 11 and seal 100b illustrated in FIG. 2. Further, the intermediary plate 504 has a thickness which is less than 1 mm. The intermediary plate 504 is formed of the same material as, and, in one embodiment, can form, at least a part of the outer seal layer 106a, 106b, and, as such, the intermediary plate 504 is formed of a material which is the same of that of the outer seal layer 106a, 106b as well as that of the layer of powdered metal 474, and, as such, is defined as including, at least in part, high hardness, a low coefficient of friction, and high wear-resistance, which, in an exemplary embodiment, is M2-tool steel. The intermediary plate 504 may be preformed by one or more known methods such as casting or any other method, and is removably attached to the metal base plate 475, 475'.

The intermediary plate 504 further includes one or more fastening apertures 606 configured to receive fasteners to fasten the intermediary plate 504 to the base 502 of the metal base plate 475. In one implementation, the intermediary plate 504 may include a first set of fastening apertures 606a provided on the outer circumference 602 and a second set of fastening apertures 606b provided on the inner circumference 604 of the intermediary plate 504. The intermediary plate 504 is fastened to the base 504 by means of one or more fasteners 506 received in the fastening apertures 606, to form the metal base plate 475. It may be contemplated that the fasteners 506 may be any type of mechanical fasteners, such as nuts and bolts, threaded fasteners, etc.

Where the main seal body 104a, 104b is formed on the intermediary plate 504, the intermediary plate 504 may be unfastened to separate the seal 100, such that the intermediary plate 504 itself forms the outer seal layer 106a, 106b of the main seal body 104a, 104b. The apertures 606 may be subsequently cut and machined to achieve the finished smooth sealing surface 102 of the seal 100.

The seal 100 as provided by the present disclosure is a hybrid metal seal formed of two different metal materials. The annular seal body 104 is formed of first metal material 124 which is either copper or hardened stainless steel that is cost effective and exhibit fast building properties to make intricate seal designs, whereas the sealing surface 102 is composed of the second metal material 128, which is Molybdenum tool steel to provide better sealing and anti-galling properties.

While aspects of the present disclosure have been particularly depicted and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method for manufacturing a seal, the method comprising:
    depositing a plurality of layers of a first material on a metal base plate of a second material to form a main seal body of the seal, the second material being different from the first material; and
    separating the seal from the metal base plate such that the seal includes the main seal body and an outer seal layer retained on the main seal body to form a seal face surface of the seal, the outer seal layer being formed of a portion of the metal base plate,
    wherein the plurality of layers of the first material is deposited in such a manner that the seal includes an outer circumference and an inner circumference, the main seal body being defined between the outer circumference and the inner circumference along a radial direction, and
    wherein the plurality of layers of the first material is deposited in such a manner that one or more channels are defined in the seal, the one or more channels having one or more openings defined on the inner circumference, the one or more channels extending through the main seal body.

2. The method of claim 1, wherein the first material is copper.

3. The method of claim 1, wherein the first material is stainless steel.

4. The method of claim 1, wherein the second material is molybdenum tool steel.

5. The method of claim 1, wherein depositing the plurality of layers of the first material further comprises individually heating each layer of the plurality of layers to form the seal.

6. The method of claim 1, wherein the metal base plate includes a base and an intermediary plate detachably coupled to the base.

\* \* \* \* \*